United States Patent
Liao et al.

(10) Patent No.: US 10,750,518 B2
(45) Date of Patent: Aug. 18, 2020

(54) ANTENNA SYSTEM AND RESTARTING METHOD THEREOF

(71) Applicant: ASUSTeK COMPUTER INC., Taipei (TW)

(72) Inventors: Zih-Guang Liao, Taipei (TW); Wen-Hsin Lin, Taipei (TW); Ching-Chung Tang, Taipei (TW); Tsung-Hsun Hsieh, Taipei (TW); You-Fu Cheng, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/421,270

(22) Filed: May 23, 2019

(65) Prior Publication Data
US 2019/0364572 A1 Nov. 28, 2019

(30) Foreign Application Priority Data
May 28, 2018 (CN) .......................... 2018 1 0525348

(51) Int. Cl.
*H04W 72/08* (2009.01)
*H04W 16/28* (2009.01)
(Continued)

(52) U.S. Cl.
CPC ............ *H04W 72/085* (2013.01); *H01Q 3/24* (2013.01); *H04W 16/28* (2013.01); *H04W 64/006* (2013.01); *H04W 72/0446* (2013.01)

(58) Field of Classification Search
CPC ...... H01Q 3/24; H04W 16/28; H04W 64/006; H04W 72/0446; H04W 72/085
(Continued)

(56) References Cited

U.S. PATENT DOCUMENTS 4,742,568 A * 5/1988 Furuya ................. H04B 7/0814
455/135
4,806,944 A * 2/1989 Jacomb-Hood .......... H01Q 3/26
343/745
(Continued)

FOREIGN PATENT DOCUMENTS

CN          101677254 B      8/2014
CN          106960557 A      7/2017
(Continued)

*Primary Examiner* — Tan H Trinh
(74) *Attorney, Agent, or Firm* — McClure, Qualey & Rodack, LLP.

(57) ABSTRACT

An antenna system includes: a plurality of antennas; a switching unit, having a plurality of switches, wherein each of the plurality of switches and the corresponding antenna are in a conducting state or in a non-conducting state; a communication unit, connected with each of the plurality of switches of the switching unit, and coupled with the antennas, wherein the communication unit receives a reference value group of the corresponding antenna from the switch in the conducting state; and a control unit, connected with the switching unit and the communication unit, wherein the control unit receives the reference value group from the communication unit, and compares the reference value group with an threshold, to determine whether the reference value group conforms to a pre-determined condition or not, and outputs a restarting instruction to restart the switching unit when the reference value group does not satisfy the pre-determined condition.

16 Claims, 7 Drawing Sheets

(51) Int. Cl.
  *H04W 64/00* (2009.01)
  *H01Q 3/24* (2006.01)
  *H04W 72/04* (2009.01)

(58) Field of Classification Search
  USPC ....... 455/41.2, 575.7, 277, 73, 82, 273, 135;
           375/347, 267, 259, 329; 342/174, 368;
           370/436
  See application file for complete search history.

(56) References Cited

U.S. PATENT DOCUMENTS

| | | | |
|---|---|---|---|
| 5,932,936 A * | 8/1999 | Potthast | H01Q 3/24 307/112 |
| 9,509,343 B2 | 11/2016 | Mujtaba et al. | |
| 2003/0032403 A1* | 2/2003 | Ono | H04B 7/0814 455/273 |
| 2005/0012658 A1* | 1/2005 | Eriksson | H01Q 3/267 342/174 |
| 2007/0058761 A1* | 3/2007 | Lindenmeier | H04B 7/0814 375/347 |
| 2008/0309555 A1 | 12/2008 | Fan et al. | |
| 2010/0045557 A1* | 2/2010 | Park | H01Q 1/243 343/770 |
| 2010/0130150 A1* | 5/2010 | D'Amico | H04B 7/0874 455/226.1 |
| 2010/0203842 A1* | 8/2010 | Tachikawa | H04B 7/061 455/73 |
| 2011/0249765 A1* | 10/2011 | Han | H04B 7/0413 375/267 |
| 2012/0142286 A1* | 6/2012 | Mitomo | H01Q 1/242 455/82 |
| 2012/0315851 A1* | 12/2012 | Park | H04B 7/0814 455/41.2 |
| 2013/0121342 A1* | 5/2013 | Kim | H04B 7/0691 370/436 |
| 2013/0273856 A1* | 10/2013 | Park | H04B 7/0404 455/73 |
| 2017/0310014 A1* | 10/2017 | Liu | H01Q 21/061 |
| 2017/0373712 A1* | 12/2017 | Kim | H04B 17/318 |

FOREIGN PATENT DOCUMENTS

| | | |
|---|---|---|
| TW | I355112 B | 12/2011 |
| TW | 201611410 A | 3/2016 |
| TW | 201707278 A | 2/2017 |

* cited by examiner

US 10,750,518 B2

ANTENNA SYSTEM AND RESTARTING METHOD THEREOF

CROSS-REFERENCE TO RELATED APPLICATION

This application claims the priority benefit of China Application Serial No. 201810525348.0 filed on May 28, 2018. The entirety of the above-mentioned patent application is hereby incorporated by reference herein and made a part of specification.

BACKGROUND OF THE INVENTION

Field of the Invention

The invention relates to an antenna system.

Description of the Related Art

Along with scientific and technological progress, electronic devices are basically equipped with wireless communication modules. However, different environments bring different communication impacts. For example, a human body is close to an antenna, a long distance away from a base station, a direction deviation, or a shielding effect of room walls and the like. All the conditions above also affect a coverage rate of a multi-antenna radiation pattern. As a result, communication capacity of a communication device at a certain angle is weaker, even a dead angle of communication is caused. These effects users' operation experiences.

BRIEF SUMMARY OF THE INVENTION

According to the first aspect of the disclosure, an antenna system is provided herein. The antenna system comprises: a plurality of antennas; a switching unit, having a plurality of switches, wherein each of the plurality of switches and the corresponding antenna are in a conducting state or in a non-conducting state; a communication unit, connected with each of the plurality of switches of the switching unit, and coupled with the antennas through the switches, wherein the communication unit receives a reference value group of the corresponding antenna from the switcher in the conducting state; and a control unit, connected with the switching unit and the communication unit, wherein the control unit receives the reference value group from the communication unit, and compares the reference value group with an threshold, so as to determine whether the reference value group conforms to a pre-determined condition or not, and outputs a restarting instruction to restart the switching unit when the reference value group does not conform to the pre-determined condition.

According to the first aspect of the disclosure, a restarting method of an antenna system is provided herein. The restarting method of the antenna system comprises: receiving a reference value group of an antenna corresponding to at least one switcher of a switching unit in a conducting state; comparing the reference value group with an threshold, to determine whether the reference value group conforms to a pre-determined condition or not; and outputting a restarting instruction to restart the switching unit when the reference value group does not conform to the pre-determined condition.

According to the above, the disclosure restarts the antenna system to drive the switches in the switching unit to be changed into the non-conducting state or the conducting state again after comparing a return value of each antenna with the threshold. Whereby, a suitable antenna is found to maintain a proper radiation pattern, a good wireless transmission quality and the user experience are kept all the time.

The detailed descriptions of other effects and embodiments of the invention are provided below with reference to the accompanying drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Figure 1:
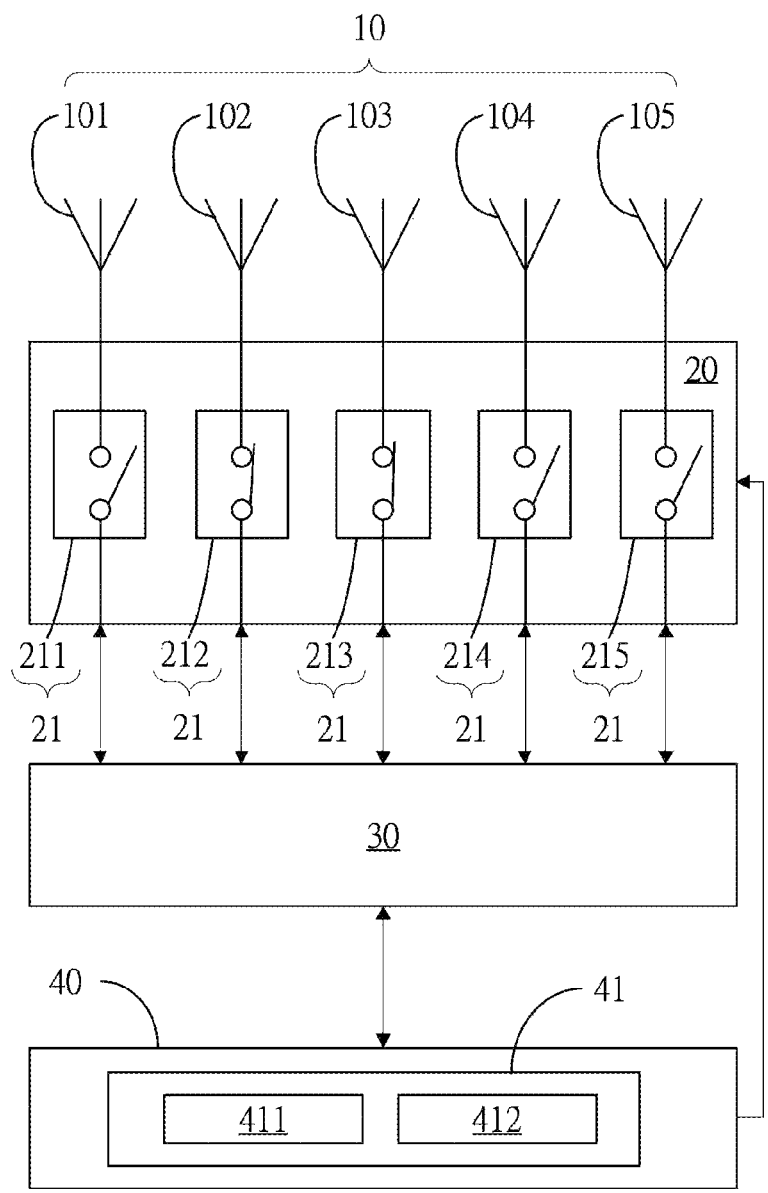
FIG. 1 is a framework schematic view of an embodiment of an antenna system of the disclosure.

Referring to FIG. 1, an antenna system comprises a plurality of antennas 10, a switching unit 20, a communication unit 30 and a control unit 40. Each antenna 10 is connected with the switching unit 20. The control unit 40 is respectively connected with the switching unit 20 and the communication unit 30. The communication unit 30 is further connected with the switching unit 20.

In one embodiment, the antenna 10 receives and transmits a wireless signal.

Referring to FIG. 1, in this embodiment, the antenna system comprises five antennas 10 (101, 102, 103, 104 and 105), but which is not limited herein.

In some embodiments, each antenna 10 is any types of antenna, such as an omnibearing antenna or a directional antenna.

Figure 2A:
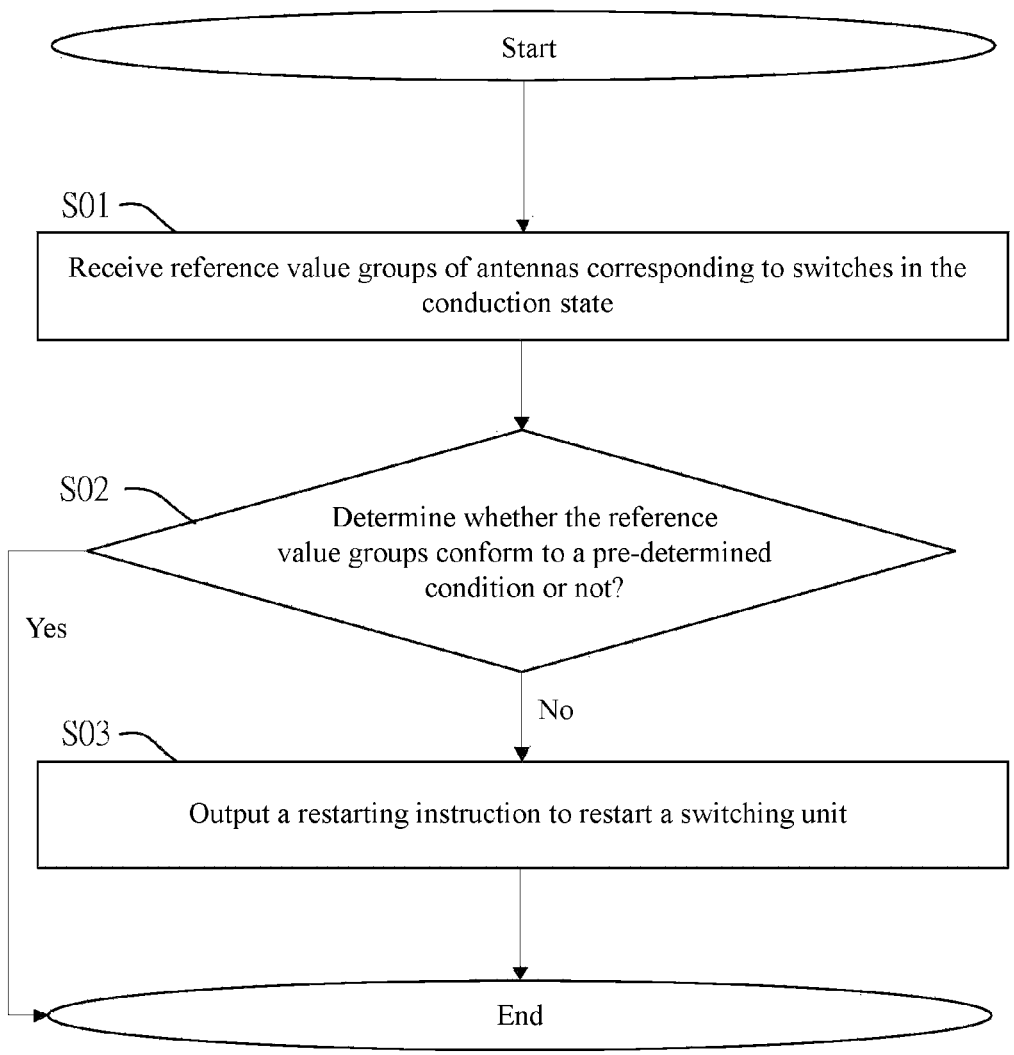
FIG. 2A is a step view of a restarting method of the antenna system of the disclosure.

Referring to FIG. 1 and FIG. 2A, the switching unit 20 comprises a plurality of switches 21, and each switch 21 corresponds to one of the antennas 10. When the switch 21 is in a conducting state, the switch 21 is electrically connected with its corresponding antenna 10. When the switch 21 is in a non-conducting state, the switch 21 and its corresponding antenna 10 are not conducted. In the embodiment, at least one of the switches 21 of the switching unit 20 is in the conducting state. In the embodiment, switches 212 and 213 are in the conducting state, and remaining switches 211, 214 and 215 are in the non-conducting state.

The antenna 10 transmits the wireless signal to the communication unit 30 by the switch 21 in the conducting state, or the communication unit 30 transmits the data to the corresponding antenna 10 by the switch 21 in the conducting state, to wirelessly output the data.

In one embodiment, the number of the switches 21 corresponds to that of the antennas 10. In other words, the total number of the antennas 10 is equal to that of the number of the switches 21. In this embodiment, the switching unit 20 comprises five switches 21 (211, 212, 213, 214 and 215), but which is not limited herein.

In FIG. 1, the switches 212 and 213 are in the conducting state, and the remaining switches 211, 214 and 215 are in the non-conducting state. Thus, the antennas 102 and 103 connected with the switches 212 and 213 to transmit the wireless signal to the communication unit 30, respectively.

The communication unit 30 receives reference value groups of the antennas 102 and 103 corresponding to the switches 212 and 213 in the conducting state (step S01). Then, the communication unit 30 transmits the reference value groups to the control unit 40.

Figure 2B:
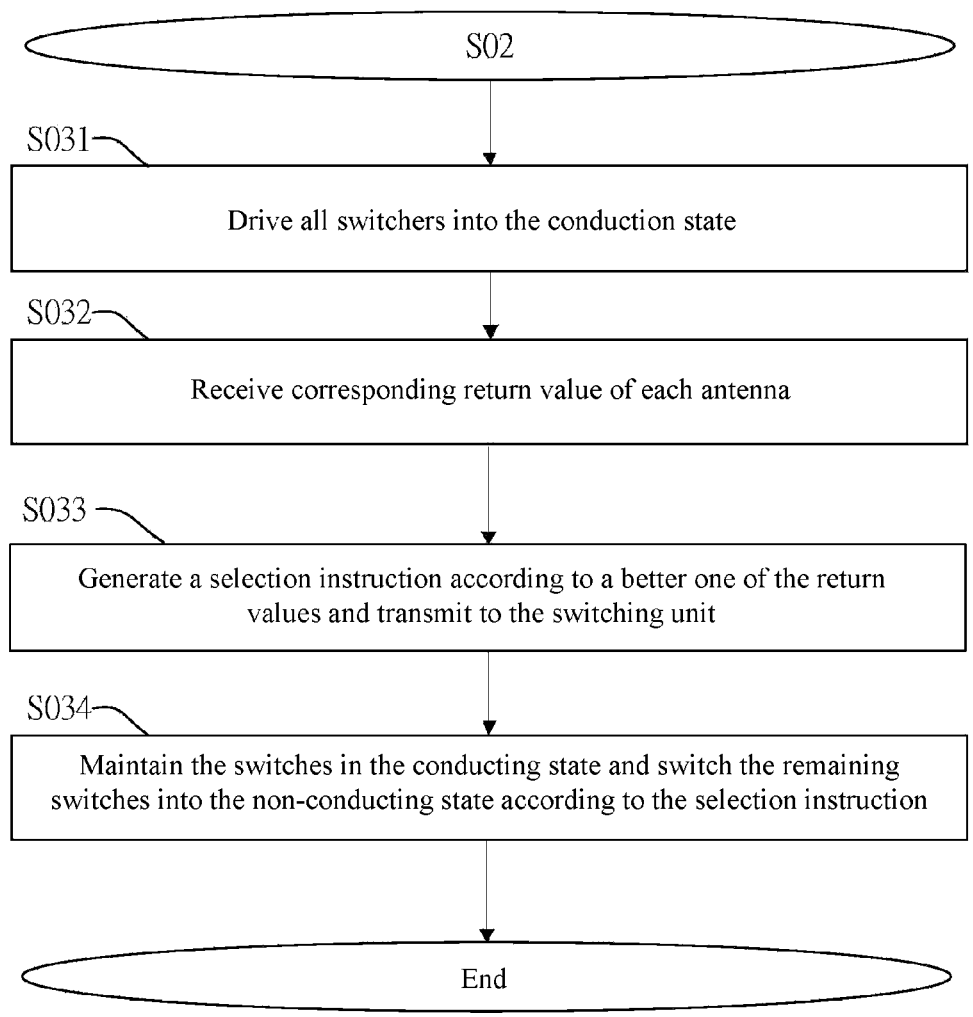
FIG. 2B is a restarting step view of the restarting method of the antenna system of the disclosure.
Figure 3:
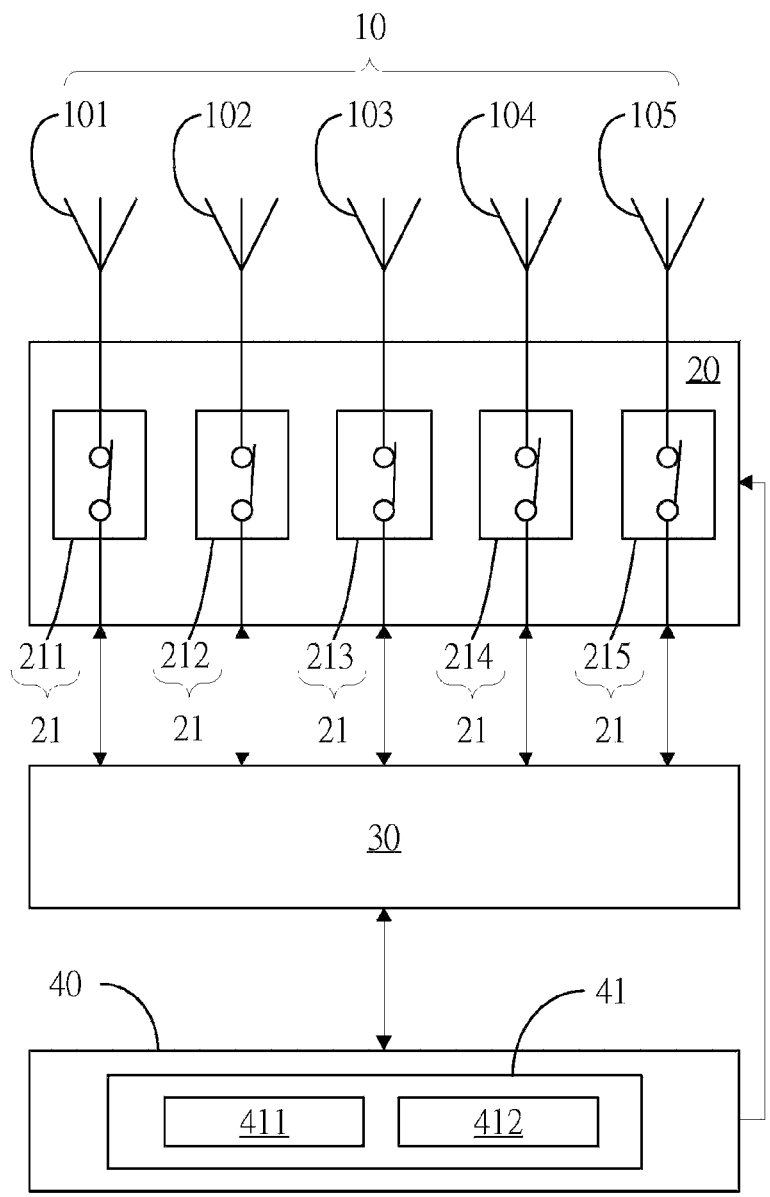
FIG. 3 is a schematic view of a restarting process of the antenna system of the disclosure.

Referring to FIG. 1 to FIG. 4, the control unit 40 compares the reference value groups with a threshold so as to determine whether the reference value groups conform to the pre-determined condition or not (step S02). When it is determined that at least one of the reference value groups does not conform to the pre-determined condition, the control unit 40 outputs a restarting instruction to restart the switching unit 20 (step S03). In the process that the switching unit 20 is restarted, the switching unit 20 switches all the switches (211 to 215) into the conducting state according to the restarting instruction (as shown in FIG. 3) (namely step S031 of FIG. 2B). Then, the control unit 40 receives return values of the antennas 10 corresponding to the switches 21 from the communication unit 30 (namely step S032 of FIG. 2B). A selection instruction is generated according to a better one of the return values and is transmitted to the switching unit 20 (namely step S033 of FIG. 2B). In detail, the control unit 40 sorts all the received return values to generate a sorting result, the better one (such as a return value top in sorting) of the return values is selected out according to the sorting result, and the corresponding selection instruction is generated.

Figure 4:
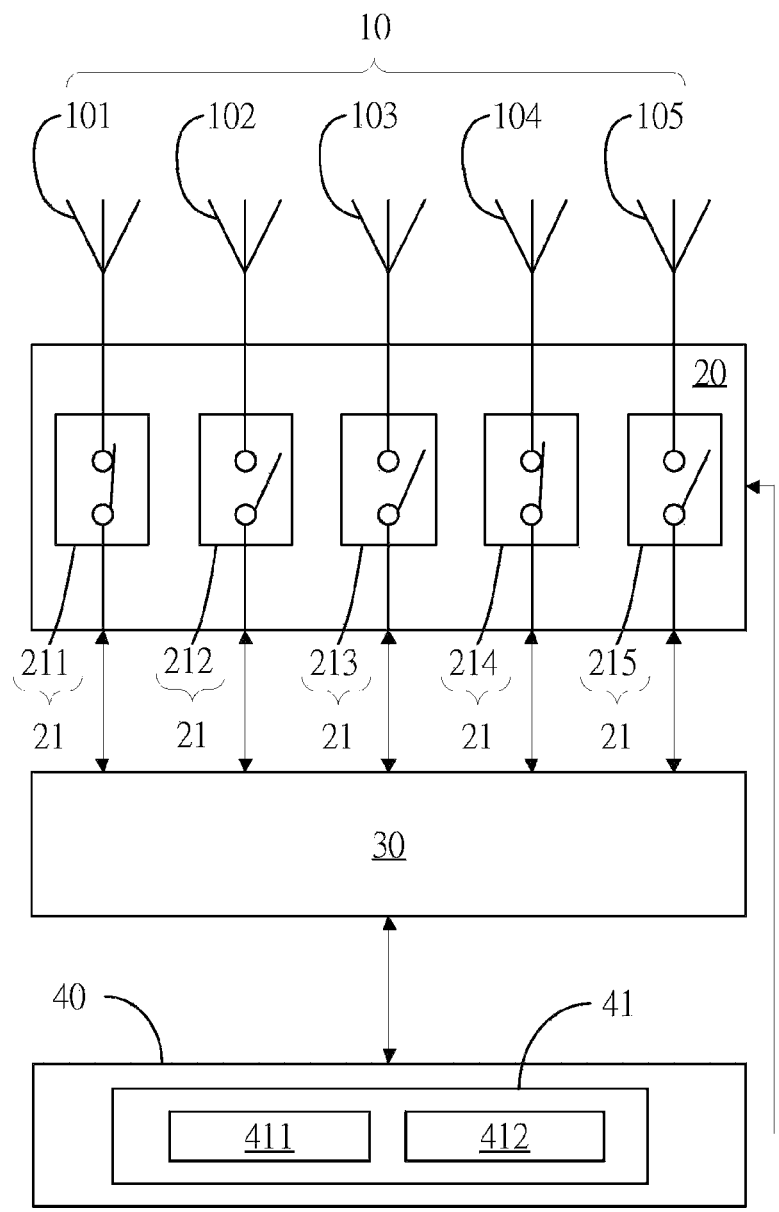
FIG. 4 is a schematic view after restarting of the embodiment of the antenna system of the disclosure.

When the control unit 40 transmits the selection instruction to the switching unit 20, the switching unit 20 selects the corresponding switch 21 according to the selection instruction and maintains the switch 21 in the conducting state, and the remaining switches 21 are switched into the open circuit state (as shown in FIG. 4) (namely step S034 of FIG. 2B). In the embodiment, referring to FIG. 3 to FIG. 4, the control unit 40 sorts all the return values to generate a sorting result. The sorting result shows that the return values of the antennas 101 and 104 corresponding to the switches 211 and 214 are the top 2 of the sorting list. Thus, the control unit 40 generates the corresponding selection instruction according to the sorting result. The switching unit 20 maintains the switches 211 and 214 in the conducting state according to the selection instruction, and switches the switches 212, 213 and 215 into the non-conducting state.

In some embodiments, the selection instruction generated by the control unit 40 is configured to maintain at least one of the switches in the conducting state, and switches the remaining switches 21 to the non-conducting state. In some embodiments, any combination of the selected switches 21 with conducting state or non-conducting state are adjustable according to the actual requirement.

When the selection instruction is selecting one of the switches 21 to be conducted, it shows that the control unit 40 sorts the return value of the antennas and selects a best return value (at top one place) in the return values sorting list according to the sorting result, and maintains the switch 21 corresponding to the best return value in the conducting state, and the remaining switches 21 are switched into the non-conducting state.

Referring to FIG. 2A again, after the control unit 40 outputs the selection instruction, the control unit 40 waits for a certain time to receive a reference value group (that is, the step S01 is repeatedly executed) of the antenna in the conducting state from the communication unit 30, so that the control unit 40 determines whether its reference value group conforms to the threshold or not (that is, the step S02 is executed). When it is determined that the reference value group does not conform to the threshold, the restarting instruction is generated again, so that the switching unit 20 is restarted (namely the step S03).

Figure 5:
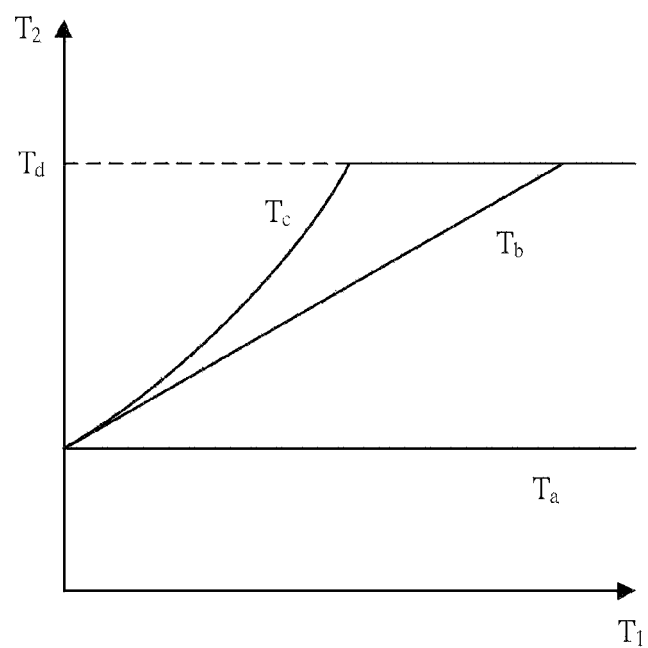
FIG. 5 is a time interval schematic view of a restarting time point of the antenna system of the disclosure.

In one embodiment, the control unit 40 presets a plurality of restarting time points, and the control unit 40 outputs the restarting instruction according to the restarting time points, to restart the switching unit 20. Each time the switching unit 20 process restarts, the control unit 40 records the sorting result of the return values of the antennas 10, and analyzes changing of the return values of the antennas 10 according to the sorting results. According to the changing of the return values of the antennas 10, a more effective time interval between the two adjacent restarting time points is calculated. In an embodiment, referring to FIG. 5, an X axis represents stand-by time T1, and a Y axis represents a time interval T2 of the switching unit 20. In one embodiment, with extension of the stand-by time, the time interval between the two adjacent restarting time points is increased in a manner of a multiple time interval Tb (such as 30 minutes, 1 hour and 2 hours). In the embodiment, when the preset time interval between two adjacent restarting time points is 30 minutes, the control unit 40 records the sorting result of the return values according to the restarting instruction every 30 minutes. And when the sorting result of the return values of sorting does not change for three consecutive times, the control unit 40 postpones the next preset restarting time point by one hour. Otherwise, when a sorting result is different from precious sorting result, the control unit 40 is maintained to output the restarting instruction at the original preset restarting time point.

Similarly, with extension of the stand-by time, the time interval between the two adjacent restarting time points is increased in a manner of an exponential time interval Tc (such as 30 minutes, 1.5 hours and 4 hours), whereby the number of times for restarting the switching unit 20 is reduced. Therefore, when the antenna system is in stable, computation load of the control unit 40 is lowered.

In one embodiment, if the antenna selected by the restarting process is the same antenna for many consecutive times, the control unit 40 increases the time interval between the two adjacent restarting time points in the manner of the multiple time interval Tb or the exponential time interval Tc.

In one embodiment, the time interval between the two adjacent restarting time points has one longest time interval Td. In an embodiment, when the longest time interval Td is 12 hours, the most length of the time interval between the two adjacent restarting time points is equal to the longest time interval Td.

Herein, detailed content relevant to the case that after the control unit 40 receives the reference value group and performs determination is illustrated below in a plurality of embodiments.

In the first embodiment, referring to FIG. 1, switches 212 and 213 in a switching unit 20 are in conducting state, and switches 211, 214 and 215 are in non-conducting state. Thus, a communication unit 30 receives reference value groups of antennas 102 and 103 from the switches 212 and 213 respectively (step S01). The reference value group relates to signal strength of wireless signals that received by the antennas 102 and 103 respectively, such as a received signal strength indicator (RSSI) value, a Ping value or other indicators relevant to the signal strength.

Figure 6:
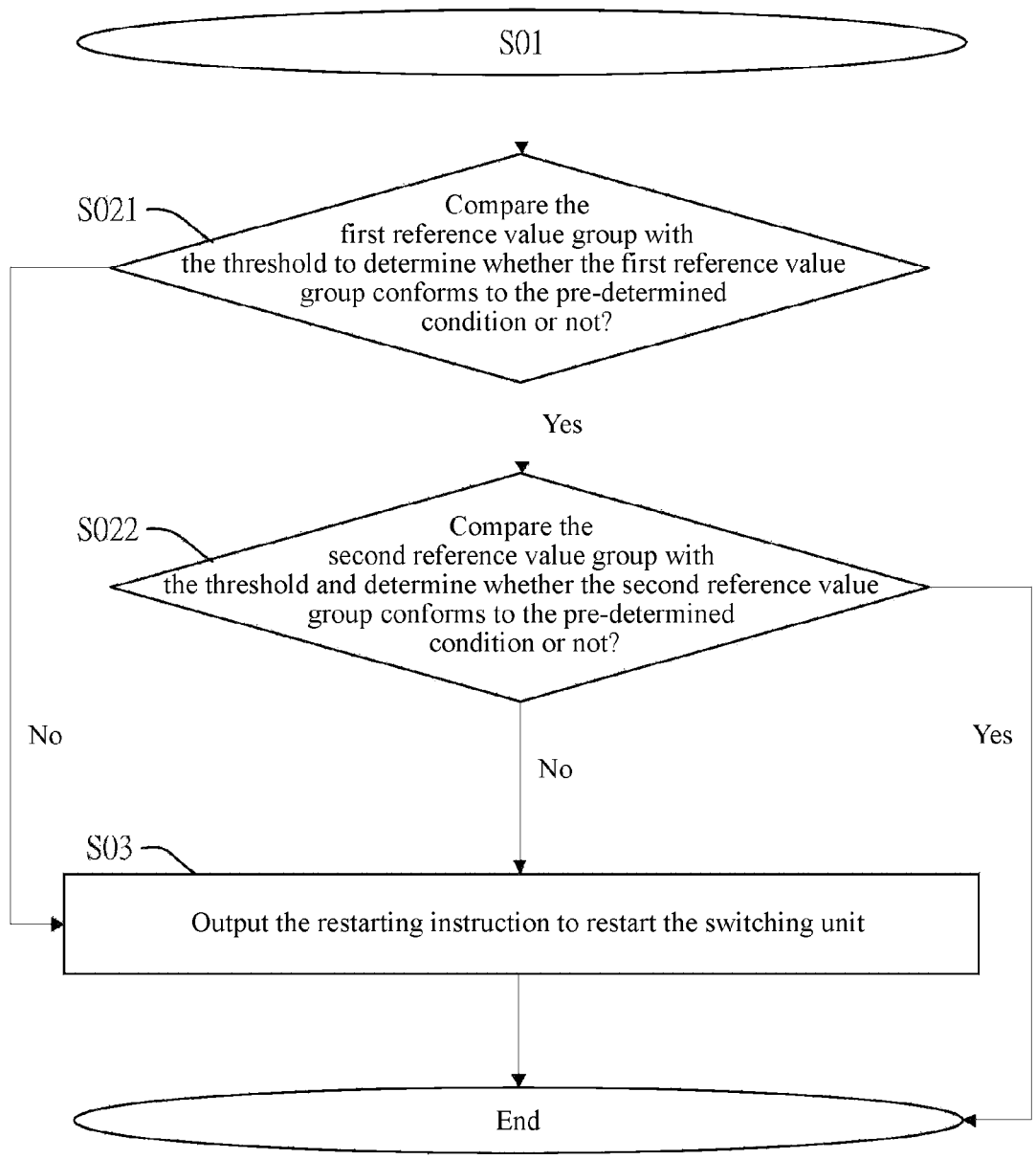
FIG. 6 is a step schematic view of a first embodiment of the antenna system of the disclosure.

In an embodiment, the reference value group is the RSSI value. When the communication unit 30 receives the wireless signals from the antennas 102 and 103, a first RSSI value (that is a first reference value group) is obtained from the wireless signal of the antenna 102 and a second RSSI value (that is a second reference value group) is obtained from the wireless signal of the antenna 103 (step S01). Then, the communication unit 30 transmits the first reference value group and the second reference value group to the control unit 40. Next, the control unit 40 determines whether any one of the first reference value group and the second reference value group is lower than a threshold or not (such as steps S021 and S022 in FIG. 6). That is, the control unit 40 determines whether the first reference value group (in this embodiment, the first RSSI value=−85 dBm) is lower than a preset threshold (in this embodiment, a preset RSSI value=−80 dBm). In the embodiment, the first reference value group is less than the threshold. That means the signal strength of the wireless signal received by the antenna 102 becomes weak, and therefore, the control unit 40 generates a restarting instruction (step S03). Then the control unit 40 transmits the restarting instruction to the switching unit 20. The switching unit 20 switches all the switches 21 into the conducting state according to the restarting instruction (step S031) (as shown in FIG. 3). Then, the control unit 40 receives the corresponding return value (the RSSI value) of each antenna 10 from the communication unit 30 (step S032), sorts the return values, and generates a selection instruction according to the sorting result to select the switches 21 (the switches 211 and 214 shown in FIG. 4) with the higher return value (step S033). Then, the switching unit 20 maintains the switches 211 and 214 in the conducting state and switches the remaining switches 212, 213 and 215 into the non-conducting state according to the selection instruction (as shown in FIG. 4) (step S034). Otherwise, when the control unit 40 determines that both the first reference value group and the second reference value group are not lower than the threshold, the control unit 40 does not output the restarting instruction. In this way, the antenna system maintains good wireless transmission quality, and the user further keeps his/her good using feeling.

In one embodiment, when the control unit 40 determines that the first reference value group (in this embodiment, the first RSSI value=−75 dBm) is greater than the threshold, the determining result conforms to the pre-determined condition. Then the control unit compares the second reference value group (in this embodiment, the second RSSI value=−85 dBm) with the threshold (in this embodiment, the preset RSSI value=−80 dBm) and determines whether the second reference value group conforms to the pre-determined condition or not (such as step S022 in FIG. 6). In the embodiment, because the determining result of the second reference value group is lower than the threshold (that is, the second reference value group does not conform to the pre-determined condition), the control unit 40 outputs a restarting instruction to the switching unit 20. Then, the switching unit 20 is restarted (such as the step S03 in FIG. 6). The switching unit 20 switches all switches 21 into the conducting state according to the restarting instruction (as shown in FIG. 3), receives corresponding return values (RSSI values) of antennas 10, and transmits the return values to the control unit 40. The control unit 40 sorts the return values to generate a sorting result, and outputs a selection instruction according to the sorting result. Then, the switching unit 20 switches the switches 21 to the conducting state or the non-conducting state according to the selection instruction received from the control unit 40.

In other embodiment, the control unit 40 compares the second reference value group with the threshold to determine whether the second reference value group conforms to the pre-determined condition or not; and then compares the first reference value group with the threshold to determine whether the first reference value group conforms to the pre-determined condition or not.

Referring to FIG. 1 and FIG. 2A, in one embodiment, the reference value group comprises an early reference value and a later reference value. The threshold is a decrease of the signal strength. In an embodiment, the threshold is a decrease of the RSSI value. That is, the control unit 40 obtains the RSSI value (that is the early reference value=−69 dBm) of an antenna 102 corresponding to the switch 212 in the conducting state at a first time point (an early time point), and obtains the RSSI value (that is the later reference value=−75 dBm) of the antenna 102 corresponding to the switch 212 in the conducting state at a second time point (a later time point). Then a difference value between the early reference value and the later reference value is calculated (such as subtracting the early reference value from the later reference value), and the difference value is compared with the threshold to determine whether the difference value conforms to the pre-determined condition or not. In an embodiment, the threshold is −5 (that is, the preset RSSI decrease is 5). When the difference value (in an embodiment, the difference value is −6) between the early reference value and the later reference value is less than the threshold, it shows that the signal strength of the wireless signal received by the antenna 102 becomes weak. Thus, the control unit 40 immediately outputs the restarting instruction to restart the switching unit 20.

In one embodiment, the reference value group received by the communication unit 30 is the Ping value of the wireless signal. When the control unit 40 determines that any one of the Ping values is greater than the threshold, the restarting instruction is generated. When the control unit 40 determines that each of the Ping values is less than or equal to the threshold, it shows that the antenna 10 corresponding to the switch 21 in the conducting state has good wireless transmission quality.

In one embodiment, in the restarting the switching unit 20 process, when the result of comparing the return values (such as the RSSI values) of the antennas 10 with the threshold does not conform to the pre-determined condition, the antenna 10 with a relatively good return value is selected and keeps continues communication by the antenna system. However, if the result of comparing the return values of the antennas 10 with the threshold does not conform to the pre-determined condition continuously, the switching unit 20 is restarted repeatedly.

Thus, when the switching unit 20 is restarted for many consecutive times (such as tree consecutive times) and the result of comparing the received return values in each restarting process with the threshold does not conform to the pre-determined condition, an threshold adjusting program is started.

In one embodiment, the threshold adjusting program is that the control unit 40 adjusts the threshold to the best return value of the antennas 10, or adjusts the threshold to a value which is a certain value (such as 5) less than the best return value, so as to avoid the switching unit 20 repeatedly restart because of unexpected results.

Referring to FIG. 1 and FIG. 2A, in one embodiment, the reference value group is the connection time of the antenna 102 captured from the received wireless signal by the communication unit 30. In this embodiment, the connection time is a time period in which the antenna 102 transmits the wireless signal. In the embodiment, the control unit 40 sets one preset connection time as the threshold. Then, the control unit 30 determines whether the connection time is less than the preset connection time or not (namely the step S02), and when the connection time is less than the preset connection time, the restarting instruction is output (namely the step S03). In the embodiment, the connection time of the antenna 102 is suddenly shortened by a transient interruption situation or other abnormality situation, and it possibly shows that the wireless communication quality of the antenna 102 is not good, thus the switching unit 20 is restarted to select the antenna which relatively having good wireless communication quality and to keep good users' experience.

Referring to FIG. 1 again, the control unit 40 further comprises a sensing module 41. The sensing module 41 comprises a positioning element 411 capable of communicating with a global positioning system (GPS), to obtain current positioning information as the reference value group. In the embodiment, the control unit 40 sets previous positioning information as the threshold, and compares the current positioning information with the previous positioning information. When the current positioning information is different from the previous time positioning information (it shows that the reference value group does not conform to the pre-determined condition), it is determined that the antenna system has been moved. In this way, the control unit 40 generates the restarting instruction to restart the switching unit 20.

In one embodiment, the sensing module 41 comprises a gravity sensing element 412, capable of sensing whether the antenna system is moved or rotated, to generate current gravity sensing information. The current gravity sensing information is taken as a system state reference value. In the embodiment, the control unit 40 sets previous gravity sensing information as the threshold, and compares the current gravity sensing information with the previous gravity sensing information. When the current gravity sensing information is different from the previous gravity sensing information (that is, the system state reference value does not conform to the pre-determined condition), it is determined that the antenna system is moved or rotated. In this way, the control unit 40 generates the restarting instruction to restart the switching unit 20.

In one embodiment, the gravity sensing element 412 is a gravity sensor (G-Sensor), a gyroscope or its combination.

According to the above embodiment, by determining whether the reference value groups of the antennas 10 conform to the pre-determined condition or not, the switching unit 20 is restarted accordingly, so as to drive the switches 21 to be changed into the non-conducting state or the conducting state. Whereby, the suitable antennas 10 are used for maintaining a proper radiation pattern, in this way, good wireless transmission quality is always kept. Moreover, by intelligently changing the threshold, the switches 21 are switched more accurately so a good user experience is thus obtained.

The above-described embodiments and/or implementations are merely illustrative of preferred embodiments and/or implementations for practicing the techniques of the disclosure, and are not intended to limit the embodiments of the techniques of the disclosure in any manner, and any person skilled in the art may make various variations or modifications to obtain other equivalent embodiments without departing from the scope of the technical means disclosed herein, and all such embodiments should still be considered to be substantially the same techniques or embodiments as the disclosure.

What is claimed is:

1. An antenna system, comprising:
a plurality of antennas;
a switching unit, having a plurality of switches, wherein each of the plurality of switches and the corresponding antenna are in a conducting state or in a non-conducting state;
a communication unit, connected with each of the plurality of switches of the switching unit, and coupled with the antennas through the switches, wherein the communication unit receives a reference value group of the corresponding antenna from the switch in the conducting state; and
a control unit, connected with the switching unit and the communication unit, wherein the control unit receives the reference value group from the communication unit, and compares the reference value group with a threshold, so as to determine whether the reference value group conforms to a pre-determined condition or not, and outputs a restarting instruction to restart the switching unit when the reference value group does not conform to the pre-determined condition,
wherein the control unit presets a plurality of restarting time points, the control unit outputs the restarting instruction at the restarting time points, and a time interval between the two adjacent restarting time points increases in an exponential time interval manner or a multiple time interval manner with stand-by time of the antenna system.

2. The antenna system according to claim 1, wherein when the switching unit is restarted, the switches are all switched into the conducting state, the control unit receives return values of the antennas, a selection instruction is generated according to a better one of the return values and is transmitted to the switching unit, the switching unit selects the corresponding switch according to the selection instruction and maintains the switcher in the conducting state, and switches the remaining switches into the non-conducting state.

3. The antenna system according to claim 2, wherein when the switching unit is restarted, the control unit sorts the return values to generate a sorting result, and a top one of the sorted return values is selected to generate the corresponding selection instruction.

4. The antenna system according to claim 2, wherein when the switching unit is continuously restarted and no return value received by the control unit conforms to the pre-determined condition, a threshold adjusting program is started.

5. The antenna system according to claim 1, wherein the control unit further comprises a positioning element, the positioning element communicates with a global positioning system to obtain current positioning information as the reference value group, the control unit sets previous positioning information as the threshold, compares the current positioning information with the previous positioning information, and generates the restarting instruction when the current positioning information is different from the previous positioning information.

6. The antenna system according to claim 1, wherein the control unit further comprises a gravity sensing element, the gravity sensing element senses dynamic changing of the antenna system to generate current gravity sensing information as a system state reference value, the control unit sets previous time gravity sensing information as the threshold, compares the current gravity sensing information with the previous time gravity sensing information, and generates the restarting instruction when the current gravity sensing information is different from the previous time gravity sensing information.

7. The antenna system according to claim 1, wherein the reference value group comprises an early reference value and a later reference value, the threshold is an decreasing degree of the reference value group, the control unit obtains the early reference value at first time, the control unit obtains the later reference value at second time, after the control unit calculates a difference value of the early reference value and the later reference value, the difference value is compared with the threshold to determine whether the difference value conforms to the pre-determined condition, and when it is determined that the difference value does not conform to the pre-determined condition, the restarting instruction is generated.

8. An antenna system, comprising:
a plurality of antennas;
a switching unit, having a plurality of switches, wherein each of the plurality of switches and the corresponding antenna are in a conducting state or in a non-conducting state;
a communication unit, connected with each of the plurality of switches of the switching unit, and coupled with the antennas through the switches, wherein the communication unit receives a reference value group of the corresponding antenna from the switch in the conducting state; and
a control unit, connected with the switching unit and the communication unit, wherein the control unit receives the reference value group from the communication unit, and compares the reference value group with a threshold, so as to determine whether the reference value group conforms to a pre-determined condition or not, and outputs a restarting instruction to restart the switching unit when the reference value group does not conform to the pre-determined condition, wherein the reference value group is a connection time of the antenna, the threshold is preset connection time, the control unit compares the connection time with the preset connection time to determine whether the connection time conforms to the pre-determined condition, and when it is determined that the connection time does not conform to the pre-determined condition, the restarting instruction is generated.

9. A restarting method of an antenna system, comprising:
receiving a reference value group of an antenna corresponding to at least one switch of a switching unit in a conducting state;
comparing the reference value group with an threshold, to determine whether the reference value group conforms to a pre-determined condition or not; and
outputting a restarting instruction to restart the switching unit when the reference value group does not conform to the pre-determined condition, wherein the reference value group is a connection time of the antenna, the threshold is a preset connection time, and the restarting method further comprises:
receiving the connection time of the antenna corresponding to the switch in the conducting state; and
comparing the connection time with the preset connection time to determine whether the connection time conforms to the pre-determined condition or not;
wherein, when the connection time does not conform to the pre-determined condition, the restarting instruction is output to restart the switching unit.

10. The restarting method of the antenna system according to claim 9, the step of restarting the switching unit further comprises:
switching all the switches in the switching unit into the conducting state;
receiving return values of the antennas corresponding to the switches;
generating a selection instruction according to a better one of the return values and transmitting the selection instruction to the switching unit; and
selecting the corresponding switch according to the selection instruction and maintaining the corresponding switch in the conducting state, and switching the remaining switches into an non-conducting state.

11. The restarting method of the antenna system according to claim 10, the step of generating the selection instruction according to the better one of the return values and transmitting the selection instruction to the switching unit further comprises:
sorting the return values to generate a sorting result; and
selecting out a top one of the sorted return values according to the sorting result to generate the corresponding selection instruction.

12. The restarting method of the antenna system according to claim 10, further comprising:
starting an threshold adjusting program when the switching unit is continuously restarted many times and every time the return value received by the control unit does not conform to the pre-determined condition.

13. The restarting method of the antenna system according to claim 9, wherein the reference value group comprises an early reference value and a later reference value, and the restarting method further comprises:
obtaining the early reference value at first time;
obtaining the later reference value at second time;
calculating a difference value of the early reference value and the later reference value; and
comparing the difference value with the threshold, and outputting the restarting instruction to restart the switching unit when the difference value does not conform to the pre-determined condition;
wherein, the threshold corresponds to an decreasing degree of the reference value.

14. The restarting method of the antenna system according to claim 9, wherein the reference value group comprises current positioning information and the threshold is previous positioning information, and the restarting method further comprises:
obtaining the current positioning information; and
comparing the current positioning information with the previous positioning information;
wherein, when the current positioning information is different from the previous time positioning information, the restarting instruction is output to restart the switching unit.

15. The restarting method of the antenna system according to claim 9, wherein the reference value group comprises current gravity sensing information and the threshold is previous time gravity sensing information, and the restarting method further comprises:
   obtaining the current gravity sensing information; and
   comparing the current gravity sensing information with the previous time gravity sensing information;
   wherein, when the current gravity sensing information is different from the previous time gravity sensing information, the restarting instruction is output to restart the switching unit.

16. The restarting method of the antenna system according to claim 9, further comprising a plurality of restarting time points, and the restarting method further comprises:
   outputting the restarting instruction at the restarting time points;
   wherein, a time interval between the two adjacent restarting time points increases in an exponential time interval manner or a multiple time interval manner with standby time of the antenna system.

\* \* \* \* \*